US011002850B2

United States Patent
Akamine et al.

(10) Patent No.: US 11,002,850 B2
(45) Date of Patent: May 11, 2021

(54) RADAR DEVICE

(71) Applicant: DENSO CORPORATION, Kariya (JP)

(72) Inventors: Yusuke Akamine, Nisshin (JP); Yasuyuki Miyake, Kariya (JP)

(73) Assignee: DENSO CORPORATION, Aichi-pref. (JP)

(*) Notice: Subject to any disclaimer, the term of this patent is extended or adjusted under 35 U.S.C. 154(b) by 0 days.

(21) Appl. No.: 16/733,556

(22) Filed: Jan. 3, 2020

(65) Prior Publication Data
US 2020/0142058 A1 May 7, 2020

Related U.S. Application Data

(63) Continuation of application No. PCT/JP2018/025505, filed on Jul. 5, 2018.

(30) Foreign Application Priority Data

Jul. 7, 2017 (JP) .............................. JP2017-133762

(51) Int. Cl.
*G01S 13/931* (2020.01)
*G01S 7/288* (2006.01)
(Continued)

(52) U.S. Cl.
CPC ............ *G01S 13/931* (2013.01); *G01S 7/288* (2013.01); *G01S 13/341* (2013.01);
(Continued)

(58) Field of Classification Search
CPC ............ G01S 7/288; G01S 2007/2883; G01S 13/341; G01S 13/343; G01S 13/345; G01S 13/584; G01S 13/931
See application file for complete search history.

(56) References Cited

U.S. PATENT DOCUMENTS

| | | | | |
|---|---|---|---|---|
| 5,563,602 A | * | 10/1996 | Stove | G01S 13/24 342/70 |
| 6,434,506 B1 | * | 8/2002 | Eckersten | G01S 13/583 342/112 |

(Continued)

FOREIGN PATENT DOCUMENTS

| | | |
|---|---|---|
| JP | 5558440 B | 7/2014 |
| JP | 2016-003872 A | 1/2016 |
| JP | 2016-114577 A | 6/2016 |

*Primary Examiner* — Peter M Bythrow
(74) *Attorney, Agent, or Firm* — Maschoff Brennan (57) ABSTRACT

A radar device includes a beat signal generation unit, a first signal processing unit, a second signal processing unit, and a speed determination unit. The first signal processing unit observes beat signals by performing a first number of observations during a first observation time and calculates a first speed from a time series of the beat signals of which number is equal to the first number of observations. The second signal processing unit observes the beat signals by performing a second number of observations during a second observation time and calculates a second speed from a time series of the beat signals of which number is equal to the second number of observations. The second observation time is longer than the first observation time. The time ratio is the ratio of the second observation time to the first observation time. The second number of observations is smaller than the first number of observations multiplied by the time ratio.

7 Claims, 12 Drawing Sheets

(51) Int. Cl.
    *G01S 13/34*     (2006.01)
    *G01S 13/58*     (2006.01)

(52) U.S. Cl.
    CPC ........... *G01S 13/343* (2013.01); *G01S 13/584* (2013.01); *G01S 2007/2883* (2013.01)

(56) References Cited

U.S. PATENT DOCUMENTS

| | | | |
|---|---|---|---|
| 6,606,052 B1* | 8/2003 | Miyahara | G01S 13/343 342/107 |
| 10,527,718 B2* | 1/2020 | Matsumoto | G01S 7/352 |
| 2011/0109495 A1* | 5/2011 | Takeya | G01S 13/4445 342/107 |
| 2015/0084806 A1* | 3/2015 | Rohling | G01S 13/582 342/109 |
| 2015/0369912 A1* | 12/2015 | Kishigami | G01S 13/26 342/113 |
| 2016/0124085 A1* | 5/2016 | Mende | G01S 13/584 342/109 |
| 2017/0082744 A1* | 3/2017 | Matsumoto | G01S 13/584 |
| 2017/0115386 A1* | 4/2017 | Morinaga | G01S 13/343 |
| 2017/0299711 A1* | 10/2017 | Kishigami | G01S 13/581 |
| 2018/0259632 A1* | 9/2018 | Kishigami | G01S 7/288 |
| 2018/0321368 A1* | 11/2018 | Bharadwaj | G01S 13/343 |

\* cited by examiner

RADAR DEVICE

CROSS-REFERENCE TO RELATED APPLICATION

This application is the U.S. bypass application of International Application No. PCT/JP2018/025505 filed Jul. 5, 2018 which designated the U.S. and claims priority to Japanese Patent Application No. 2017-133762, filed Jul. 7, 2017, the contents of which are incorporated herein by reference.

TECHNICAL FIELD

The present disclosure relates to a radar device utilizing a chirp wave.

BACKGROUND

A chirp wave is a radar wave having a continuously increasing or decreasing frequency. A radar device utilizing the chirp wave performs frequency analysis on beat signals obtained by transmitting and receiving the chirp wave a plurality of times, to calculate a distance to an object and the speed of the object. The calculated speed is such that a maximum detectable speed increases with decreasing intervals between observation points for the chirp wave and that a speed resolution increases consistently with observation time during one observation cycle.

SUMMARY

An aspect of the present disclosure is a radar device including a beat signal generation unit, a first signal processing unit, a second signal processing unit, and a speed determination unit. The beat signal generation unit transmits and receives a chirp wave having at least a continuously increasing or decreasing frequency, to repeat generation of beat signals. The first signal processing unit observes the beat signals generated by the beat signal generation unit by performing a set first number of observations during a set first observation time, and calculates a first speed from phase rotation of a frequency component detected in a time series of the beat signals of which number is equal to the first number of observations. The second signal processing unit observes the beat signals generated by the beat signal generation unit by performing a second number of observations during a second observation time, and calculates a second speed from phase rotation of a frequency component detected in a time series of the beat signals of which number is equal to the second number of observations. The second observation time is an observation time set longer than the first observation time. A time ratio is a ratio of the second observation time to the first observation time. The second number of observations is smaller than the first number of observations multiplied by the time ratio. The speed determination unit is configured to uniquely determine the measurement result of the speed represented by the resolution realized by the second signal processing unit, using the first speed calculated by the first signal processing unit.

BRIEF DESCRIPTION OF THE DRAWINGS

In the accompanying drawings.

DETAILED DESCRIPTION OF THE PREFERRED EMBODIMENTS

An object detection device described in JP 5558440 detects an object based on an image captured by a camera and a reception signal received by a radar device utilizing the chirp wave. In a case where a detected object is determined to be a pedestrian based on an image from the camera, the object detection device extends the time of observation performed by the radar during one observation cycle to increase the speed resolution.

In the radar device utilizing the chirp wave, by increasing the observation time with the intervals between the observation points maintained, the speed resolution can be increased with the maximum detectable speed maintained. However, the results of detailed studies by the inventor indicate that the extended observation time increases the number of chirps, leading to a disadvantageous increase in calculation loads. Additionally, extending the observation time with increased intervals between the observation points suppresses an increase in the number of chirps, enabling an increase in speed resolution while suppressing the increase in calculation loads. However, the results of the detailed studies by the inventor indicate that the increased intervals between the observation points reduce the maximum detectable speed, leading to a disadvantageous increase in ambiguity of the speed.

In the present disclosure, it is desirable to suppress an increase in calculation loads, while allowing both the maximum detectable speed and the speed resolution to be kept appropriate in a compatible manner.

An aspect of the present disclosure is a radar device including a beat signal generation unit, a first signal processing unit, a second signal processing unit, and a speed determination unit. The beat signal generation unit transmits and receives a chirp wave having at least a continuously increasing or decreasing frequency, to repeat generation of beat signals. The first signal processing unit observes the beat signals generated by the beat signal generation unit by performing a set first number of observations during a set first observation time, and calculates a first speed from phase rotation of a frequency component detected in a time series of the beat signals of which number is equal to the first number of observations. The second signal processing unit observes the beat signals generated by the beat signal generation unit by performing a second number of observations during a second observation time, and calculates a second speed from phase rotation of a frequency component detected in a time series of the beat signals of which number is equal to the second number of observations. The second observation time is an observation time set longer than the first observation time. A time ratio is a ratio of the second observation time to the first observation time. The second number of observations is smaller than the first number of observations multiplied by the time ratio. The speed determination unit is configured to uniquely determine the measurement result of the speed represented by the resolution realized by the second signal processing unit, using the first speed calculated by the first signal processing unit.

According to an aspect of the present disclosure, the first signal processing unit calculates the first speed from the beat signals observed at relatively short intervals between observation points during a relatively short observation time. In this case, in spite of the relatively short intervals between the observation points, the relatively short observation time suppresses an increase in calculation loads. Accordingly, the first speed with a relatively high maximum detectable speed can be calculated, with an increase in calculation loads suppressed. Additionally, the second signal processing unit calculates the second speed from the beat signals observed at relatively long intervals between the observation points during a relatively long observation time. In this case, in spite of the relatively long observation time, the relatively long intervals between the observation points suppress an increase in calculation loads. Accordingly, the second speed with a relatively high speed resolution can be calculated, with an increase in calculation loads suppressed. The first speed with the relatively high maximum detectable speed is then used to uniquely calculate a result of measurement represented as the speed resolution of the second speed. Accordingly, both the maximum detectable speed and the speed resolution can be kept appropriate in a compatible manner, with an increase in calculation loads suppressed.

Illustrative embodiments of the present disclosure will be described with reference to the drawings.

First Embodiment 1-1. Configuration

Figure 1:
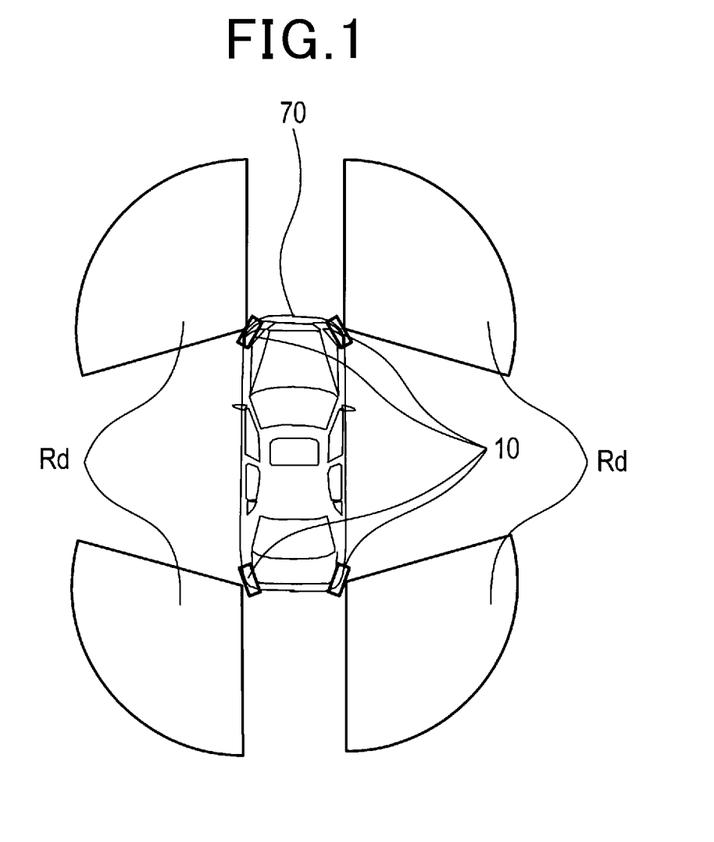
FIG. 1 is a diagram illustrating mounting positions and detection ranges of radar devices in a vehicle.

First, a configuration of a radar device 10 according to the present embodiment will be described with reference to FIG. 1 and FIG. 2. As illustrated in FIG. 1, the radar device 10 is mounted at four positions in a vehicle 70, on a left front side, a right front side, a left rear side, and a right rear side of the vehicle 70. Specifically, for example, the radar device 10 is mounted at a right end and a left end of a front bumper and a right end and a left end of a rear bumper of the vehicle 70. Detection areas Ad of the radar device 10 are a left front area, a right front area, a left rear area, and a right rear area of the vehicle 70.

The radar device 10 radiates a radar wave and receives a reflected wave of the radar wave to observe, based on the reception signal, a distance to an object reflecting the radar wave, and a speed and an orientation of the object. The radar device 10 is a millimeter-wave radar for an FCM system that transmits and receives, as a radar wave, a chirp wave described below. FCM is an abbreviation for Fast Chirp Modulation.

Figure 2:
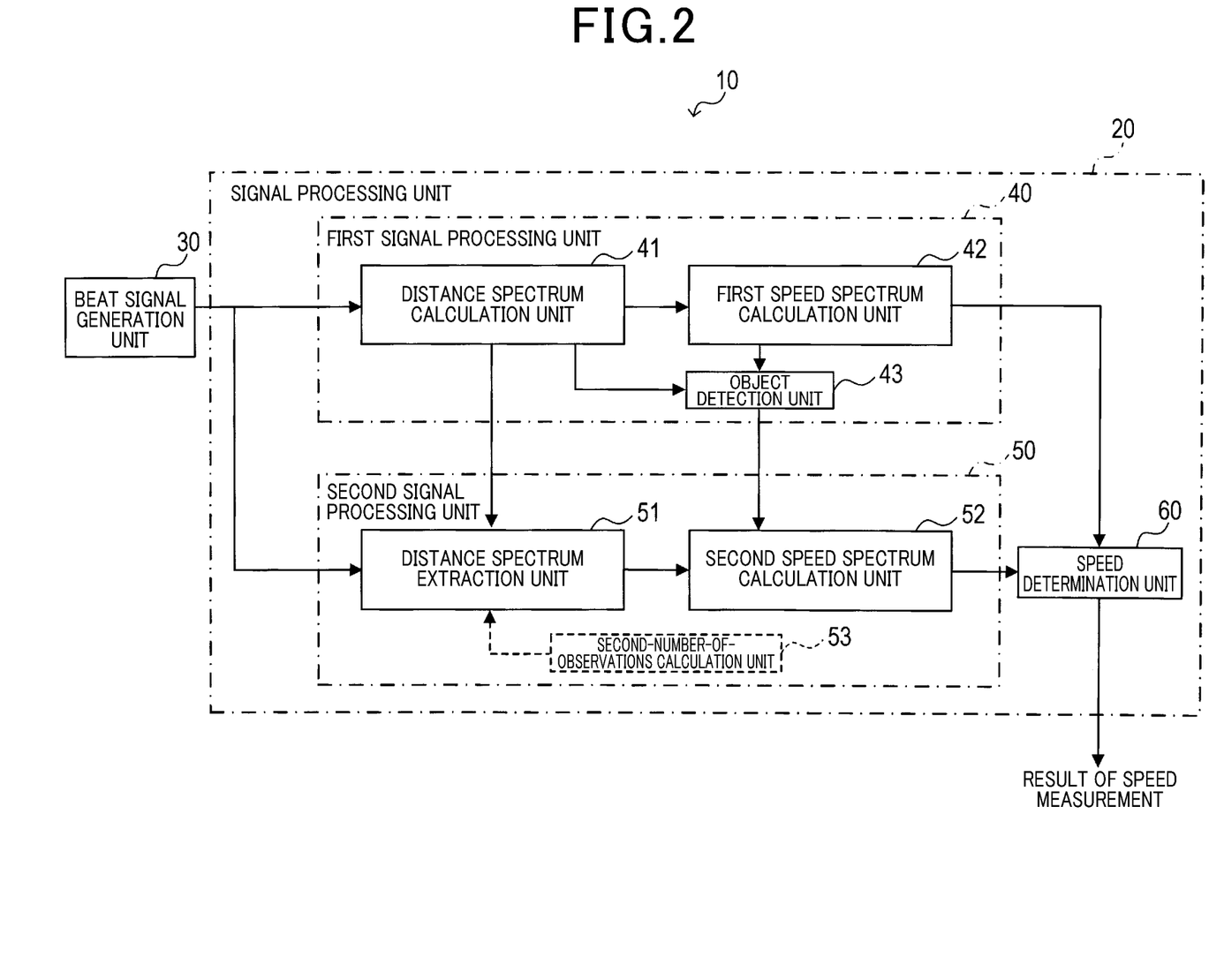
FIG. 2 is a block diagram illustrating a configuration of the radar device.

As illustrated in FIG. 2, the radar device 10 includes elements of a beat signal generation unit 30 and a signal processing unit 20.

Figure 3:
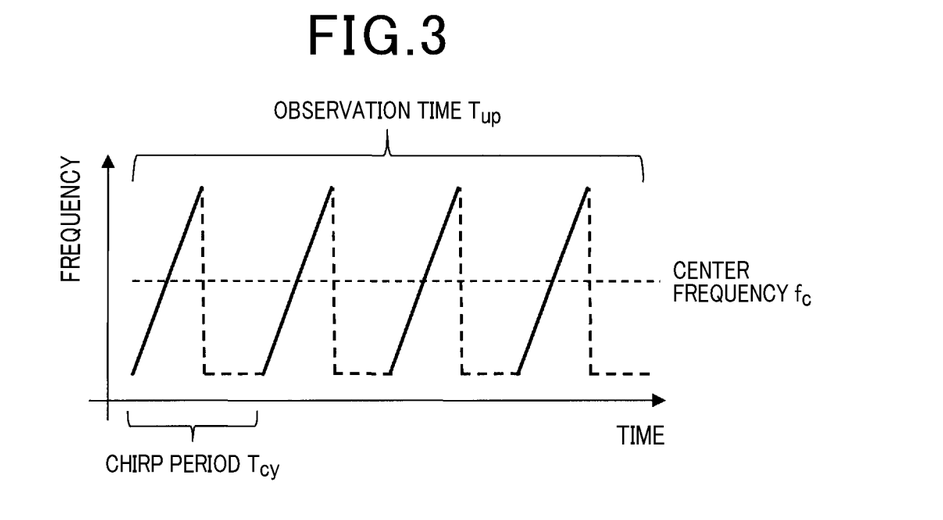
FIG. 3 is a diagram illustrating a modulation scheme for a radar wave transmitted by the radar device.

The beat signal generation unit 30 includes a transmitting antenna and a receiving antenna with a plurality of arrayed antenna elements. The beat signal generation unit 30 repeatedly transmits a chirp wave with a center frequency fc based on a transmission signal. As illustrated in FIG. 3, the chirp wave is a frequency-modulated radar wave with a frequency varying like saw teeth. In other words, the chirp wave is a radar wave with a continuously increasing or decreasing frequency. FIG. 3 illustrates a chirp wave with a continuously increasing frequency. However, the chirp wave may have a continuously decreasing frequency. An observation point is a point in time when the frequency starts continuous increase. A chirp period Tcy is an interval between one observation point and the next observation point. Additionally, the beat signal generation unit 30 repeatedly receives a chirp wave reflected from an obstacle and generates a reception signal. The beat signal generation unit 30 repeatedly generates beat signals from repeatedly transmitted and received transmission signals and reception signals.

The signal processing unit 20 includes a CPU, a ROM, a RAM, and a microcomputer including a core processor executing fast Fourier transform (hereinafter referred to as FFT) processing. In the signal processing unit 20, the CPU and the like execute programs stored in the ROM to implement functions of a first signal processing unit 40, a second signal processing unit 50, and a speed determination unit 60. The first signal processing unit 40 includes functions of a distance spectrum calculation unit 41, a first speed spectrum calculation unit 42, and an object detection unit 43. Additionally, the second signal processing unit 50 includes functions of a distance spectrum extraction unit 51 and a second speed spectrum calculation unit 52. Additionally, execution of relevant programs allows methods corresponding to the programs to be executed. Furthermore, a method for implementing the functions is not limited to software, and some or all of the elements of the functions may be implemented using hardware including a combination of logical circuits, analog circuits, and the like. Note that the functions of the signal processing unit 20 will be described below in detail.

1-2. Speed Detection Processing

Figure 4:
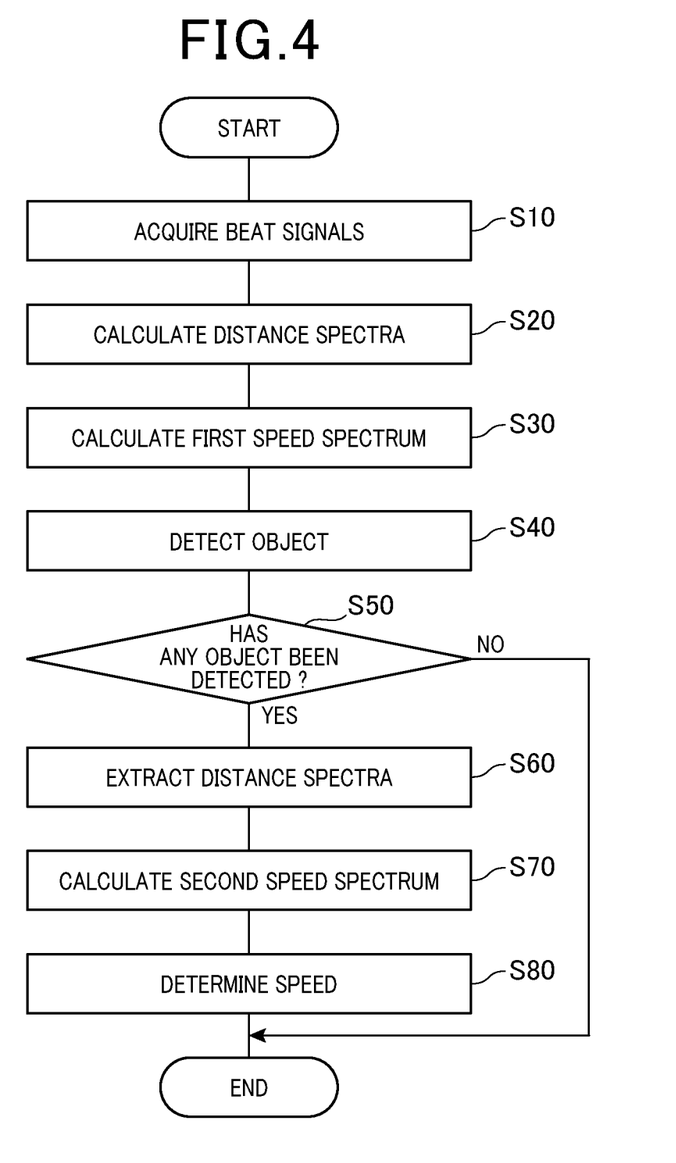
FIG. 4 is a flowchart illustrating a processing procedure for speed detection according to a first embodiment.

Now, a process procedure for detecting the speed of an object according to the present embodiment will be described with reference to a flowchart in FIG. 4. The present process procedure is executed each time the signal processing unit 20 transmits and receives a predetermined number of chirp waves.

First, in S10, beat signals are acquired. In other words, as illustrated on FIG. 5 and FIG. 6, a predetermined number of beat signals are acquired that are generated from transmission signals and reception signals for a predetermined number of chirp waves transmitted and received during the current processing cycle.

Figure 5:
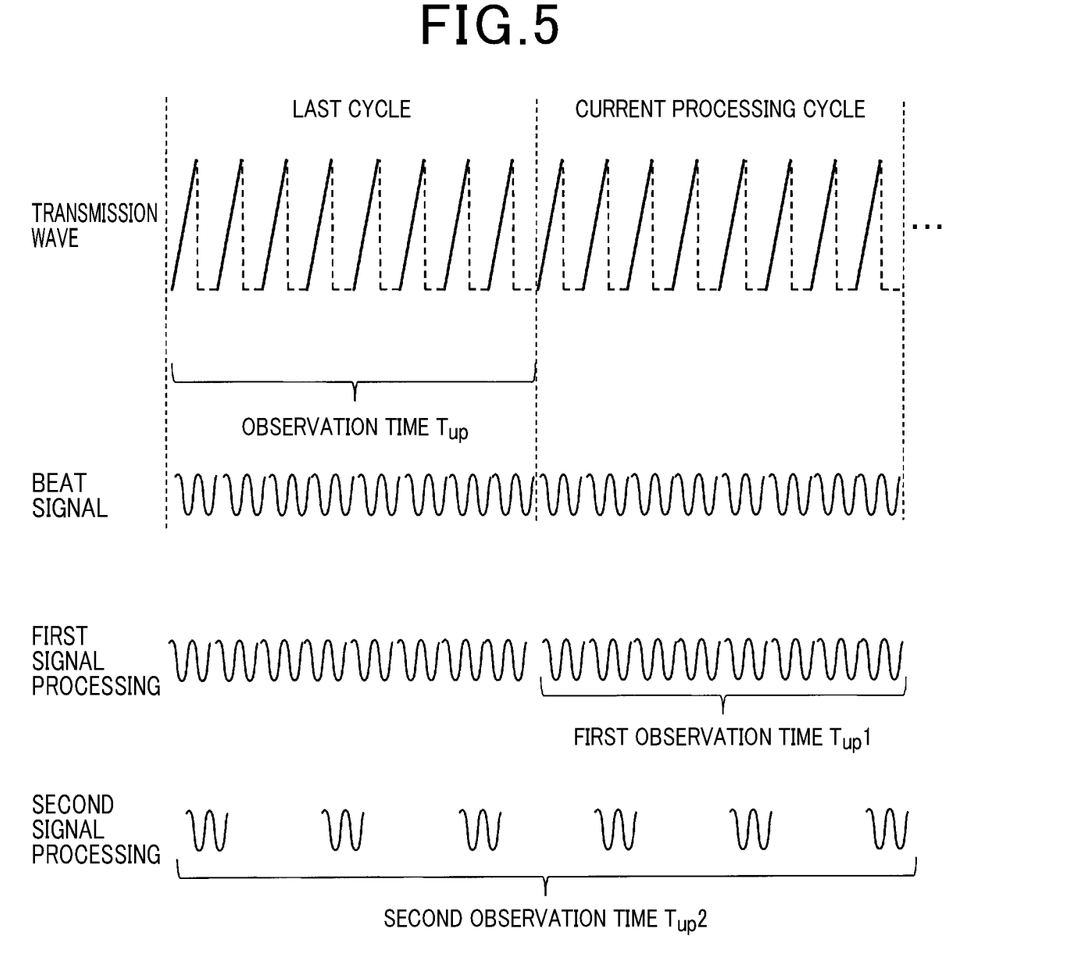
FIG. 5 is a diagram illustrating an example of a first observation time and a first number of observations and a second observation time and a second number of observations according to the first embodiment.
Figure 6:
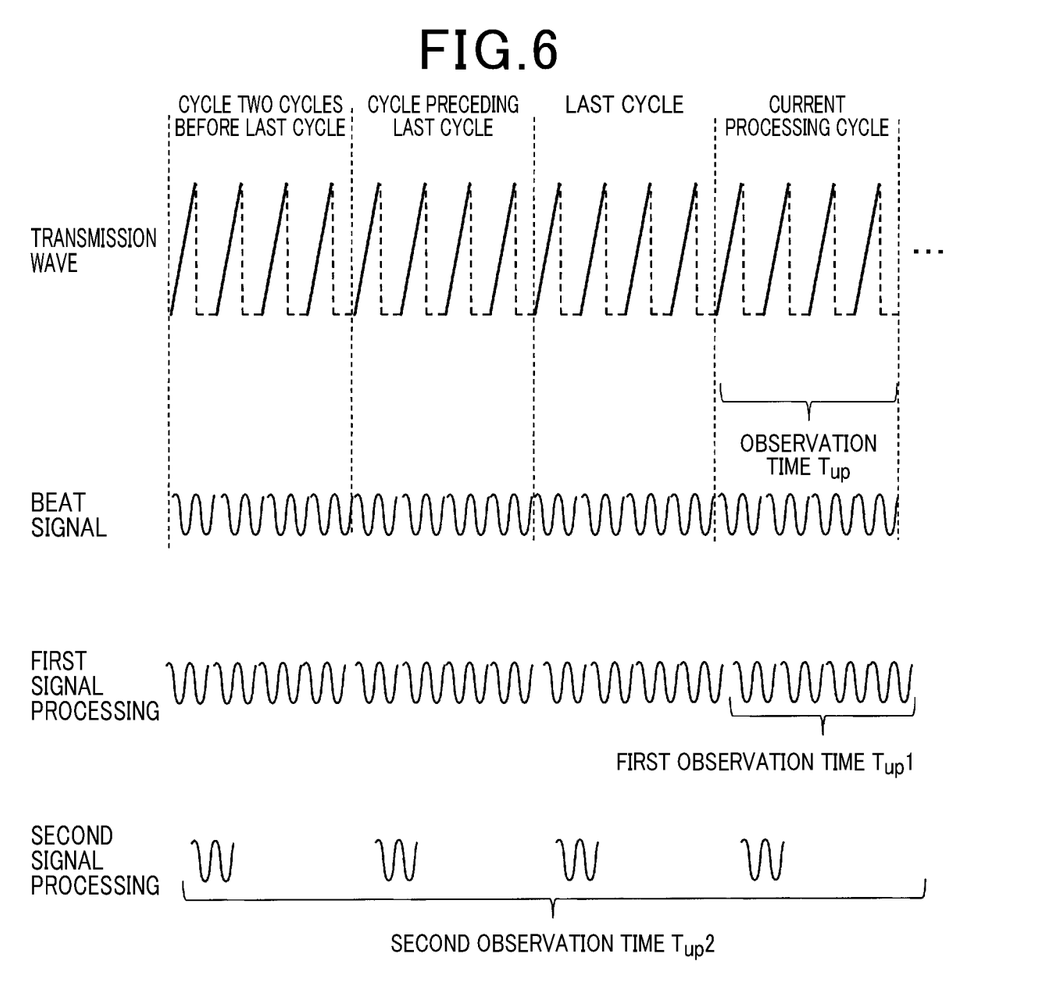
FIG. 6 is a diagram illustrating an example of the first observation time and the first number of observations and the second observation time and the second number of observations according to the first embodiment.

Subsequently, in S20, the beat signals acquired in S10 are frequency-analyzed to calculate a distance spectrum representing distance information. Specifically, as illustrated in FIG. 5 and FIG. 6, N1 beat signals are observed during an observation time Tup1. The observation time Tup1 is the period of one processing cycle. The observation time Tup1 corresponds to a first observation time. The N1 is a preset first number of observations and is the number of chirps during the observation time Tup1. In this case, the intervals between adjacent observation points for the N1 beat signals are designated as chirp periods Tcy1.

Figure 7:
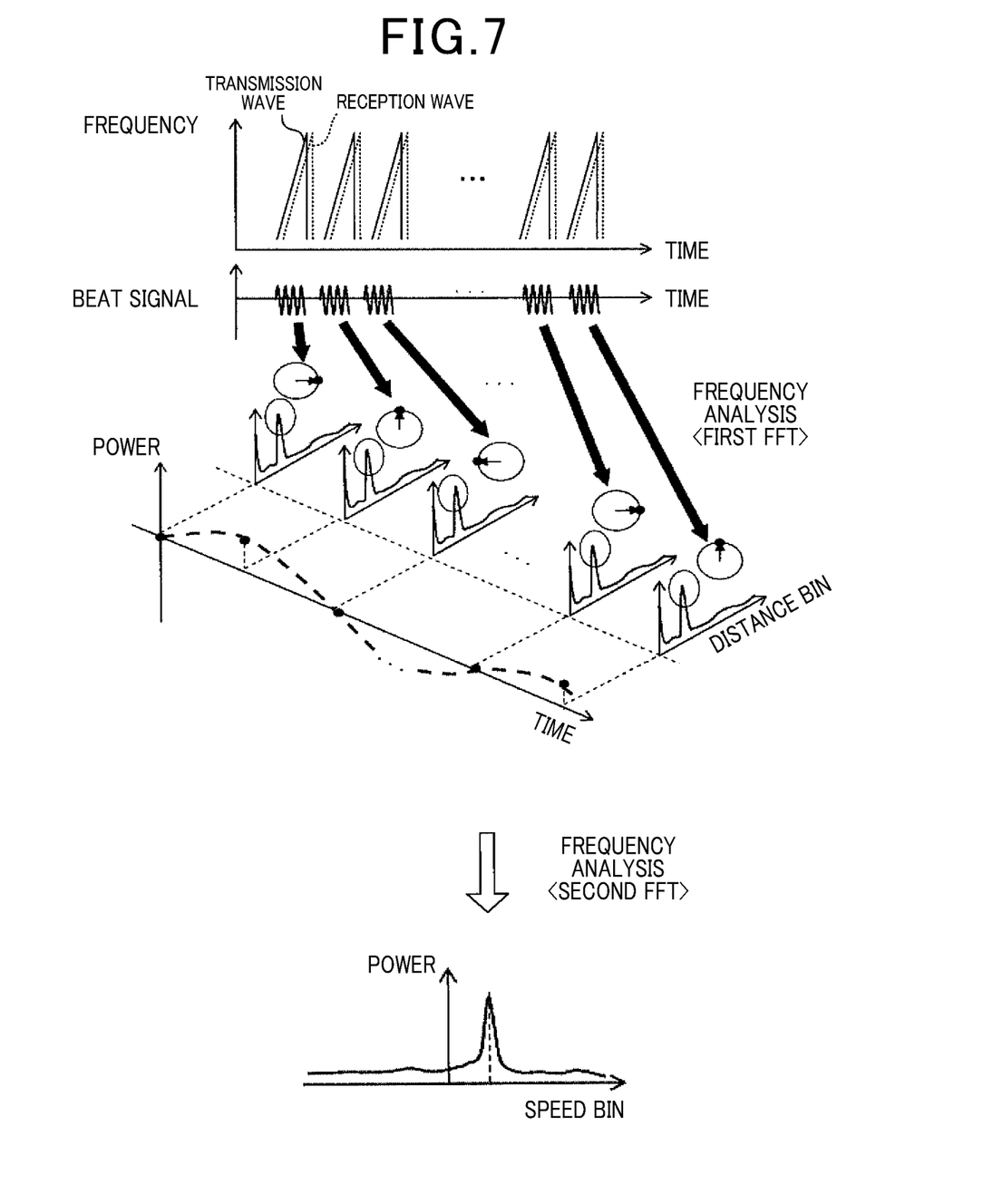
FIG. 7 is a diagram illustrating an outline of two-dimensional FFT.

As illustrated in FIG. 7, as first FFT processing, FFT processing is executed on each of the N1 beat signals to calculate N1 distance spectra. Each of the distance spectra represents power for a distance BIN. The beat signal has a frequency component corresponding to a distance to an object, and thus the frequency BIN of the calculated distance spectrum corresponds to the distance BIN.

Subsequently, in S30, the time series of the N1 distance spectra calculated in S20 is frequency-analyzed to calculate a first speed spectrum representing speed information. The N1 beat signals based on a reflected wave from the same object all have the same frequency component. In other words, in the N1 distance spectra, the peak corresponds to the same frequency BIN. However, in a case where the object and the vehicle 70 have a relative speed, phases of the N1 beat signals have slightly different values on a beat-signal-to-beat-signal basis. Accordingly, as illustrated in FIG. 7, as second FFT processing, the FFT processing is executed, for each distance BIN, on the time series of the N1 distance spectra. A first speed spectrum representing power for the speed BIN is calculated for each distance BI. In other words, N1 distance spectra are collected for each distance BIN, and the FFT processing is executed, for each distance BIN, on the time series of the collected N1 distance spectra. The calculated frequency BIN of the spectra is a frequency component corresponding to a rotation speed of the phase of the beat signal and corresponds to the speed BIN.

Subsequently, in S40, objects are detected that correspond to peaks of the distance spectra calculated in S20 and a peak of the first speed spectrum generated in S30, and each of the detected objects is associated with a distance calculated from the distance spectrum and a first speed V1 calculated from the first speed spectrum. No object is detected in a case where the distance spectra and the first speed spectrum contain no peak.

Subsequently, in S50, whether any object has been detected in S40 is determined. In a case where no object has been detected in S40, the present processing is ended. On the other hand, in a case where any object has been detected in S40, the processing proceeds to S60.

Subsequently, in S60, N2 distance spectra are extracted from a distance spectrum corresponding to beat signals during an observation time Tup2. The observation time Tup2 is preset longer than the observation time Tup1. The observation time Tup2 corresponds to a second observation time, and the N2 corresponds to a second number of observations.

Specifically, as illustrated in FIG. 5, in a case where the observation time Tup2 is double the observation time Tup1, N2 distance spectra are extracted from 2×N1 distance spectra calculated in S20 of the current processing cycle and in S20 of the preceding processing cycle. The N2 is preset to a number smaller than N1×(Tup2/Tup1). In other words, in a case where the observation time Tup2 is double the observation time Tup1, the N2 is set to a number smaller than 2×N1. Thus, (2×N1−N2) distance spectra are decimated from the 2×N1 distance spectra to extract N2 distance spectra.

Additionally, as illustrated in FIG. 6, in a case where the observation time Tup2 is four times as long as the observation time Tup1, N2 distance spectra are extracted from 4×N1 distance spectra calculated in S20 of the current processing cycle, in S20 of the last processing cycle, in S20 of the processing cycle preceding the last processing cycle, and in S20 of the processing cycle two cycles before the last processing cycle.

In the next S70, the FFT processing is executed on the N2 distance spectra. Thus, for the sake of convenience of the FFT processing, the N2 distance spectra are extracted such that observation points for beat signals corresponding to the distance spectra to be extracted are set at regular intervals. In other words, the N2 is a number at which the adjacent observation points for the beat signals corresponding to the distance spectra to be extracted are set at regular intervals. Furthermore, for an increased speed of the FFT processing, the N2 may be equal to N1×1/(2n), where n is a positive integer. In this case, the intervals between the adjacent observation points for the beat signals corresponding to the N2 distance spectra are designated as chirp periods Tcy2.

Subsequently, in S70, as is the case with S30, the FFT processing is executed, for each of distances BIN, on a time series of the N2 distance spectra extracted in S60, to calculate a second speed spectrum representing speed information. The calculated second speed spectrum is obtained based on the time series of the N2 beat signals observed during the observation time Tup2. At this time, among the distance spectra collected for each distance BIN, the FFT processing is executed only on the distance spectra for the distance BIN representing the distance to the object detected in S40. A peak is extracted from the second speed spectrum, and the second speed V2 is calculated from the speed BIN of the extracted peak.

Subsequently, in S80, a speed V0 that is a result of measurement of the object speed is determined. In this case, the speed determined from the phase rotation of the beat signals may contain ambiguity resulting from phase fold-back. This is because, in a case where a detected phase is θ, the actual phase may be θ+2π·k, where k is an integer, thus preventing the speed from being determined to be a value corresponding to the detected phase. For the FCM system, the range of the speed V that can be detected with no ambiguity is indicated by Expression (1), where c is the speed of light.

[Expression 1]

$$-\frac{c}{4f_c \cdot T_{cy}} < V < \frac{c}{4f_c \cdot T_{cy}} \qquad (1)$$

As indicated by Expression (1), the range of the speed V that can be detected with no ambiguity, in other words, the maximum detectable speed Vmax, increases with decreasing chirp period Tcy. As described above the second speed V2 is calculated based on the time series of the N2 beat signals. The chirp period Tcy2 of the N2 beat signals is longer than the chirp period Tcy1. Accordingly, the second speed V2 has a lower maximum detectable speed Vmax than the first speed V1 and is likely to involve fold-back.

Additionally, for the FCM system, a speed resolution Vres is expressed by Expression (2) below. As indicated by Expression (2), the speed resolution Vres increases consistently with observation time Tup. As described above, the second speed V2 is calculated based on the time series of the beat signals observed during the observation time Tup2, which is longer than the observation time Tup1. Accordingly, the second speed V2 has a higher speed resolution Vres than the first speed V1.

[Expression 2]

$$V_{res} = \frac{c}{2f_c \cdot T_{up}} \quad (2)$$

In the present embodiment, the first speed V1 allows the speed to be uniquely determined all over the speed measurement range and has a relatively low resolution Vres. On the other hand, the second speed V2 is likely to involve fold-back within the speed measurement range and has a relatively high-speed resolution Vres.

Thus, the first speed V1 and the second speed V2 corresponding to the same object, in other words, the same distance, are compared with each other, and the speed V0 uniquely determined and represented as the speed resolution Vres of the second speed V2 is determined. Specifically, the first speed V1 is compared with a plurality of speed candidates V21, V22, . . . , V2m determined in consideration of fold-back of the second speed V2, and a speed candidate closest to the first speed V1 is determined to be the speed V0. Then, the present processing is ended.

In the present embodiment, the processing in S20 corresponds to the function of the distance spectrum calculation unit 41, the processing in S30 corresponds to the function of the first speed spectrum calculation unit 42, and the processing in S40 corresponds to the function of the object detection unit 43. Additionally, the processing in S60 corresponds to the function of the distance spectrum extraction unit 51, the processing in S70 corresponds to the function of the second speed spectrum calculation unit 52, and the processing in S80 corresponds to the speed determination unit 60.

1-3. Operation

Figure 8:
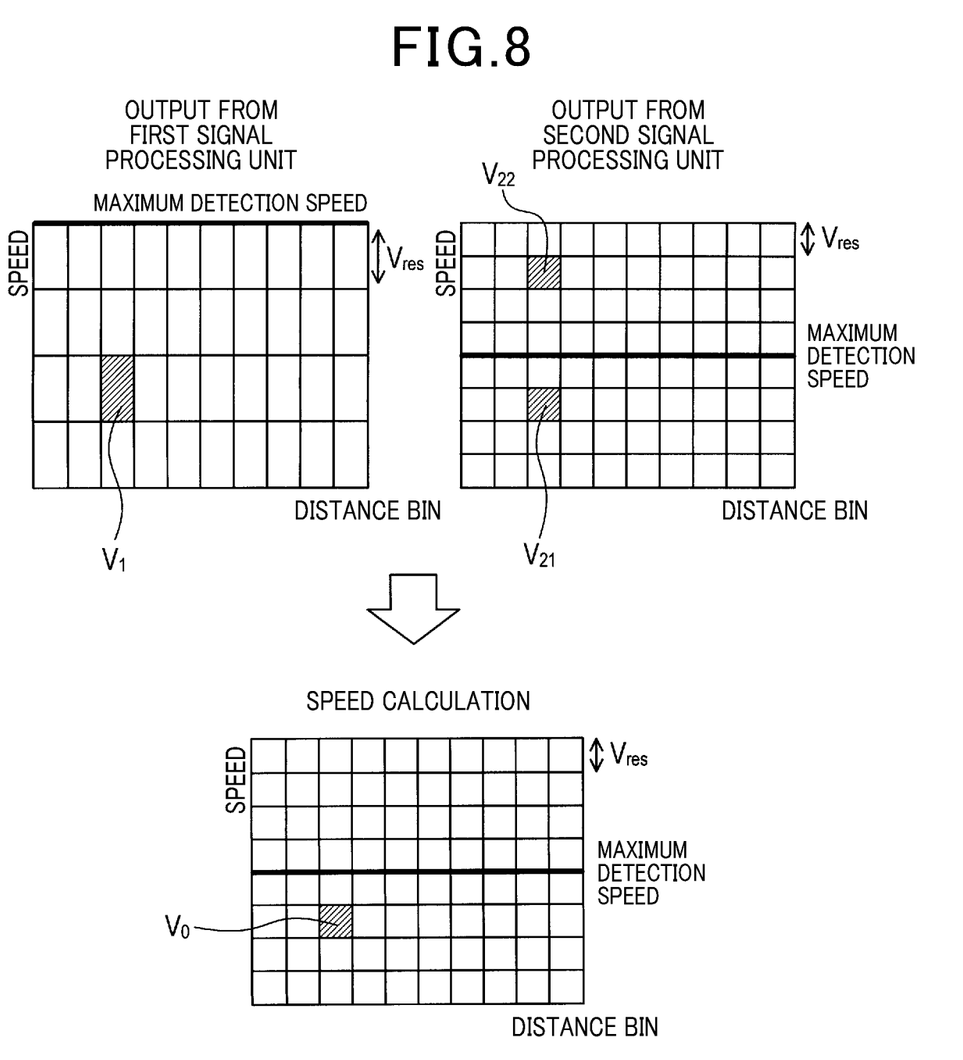
FIG. 8 is a diagram illustrating a method for speed determination according to the first embodiment.
Figure 9:
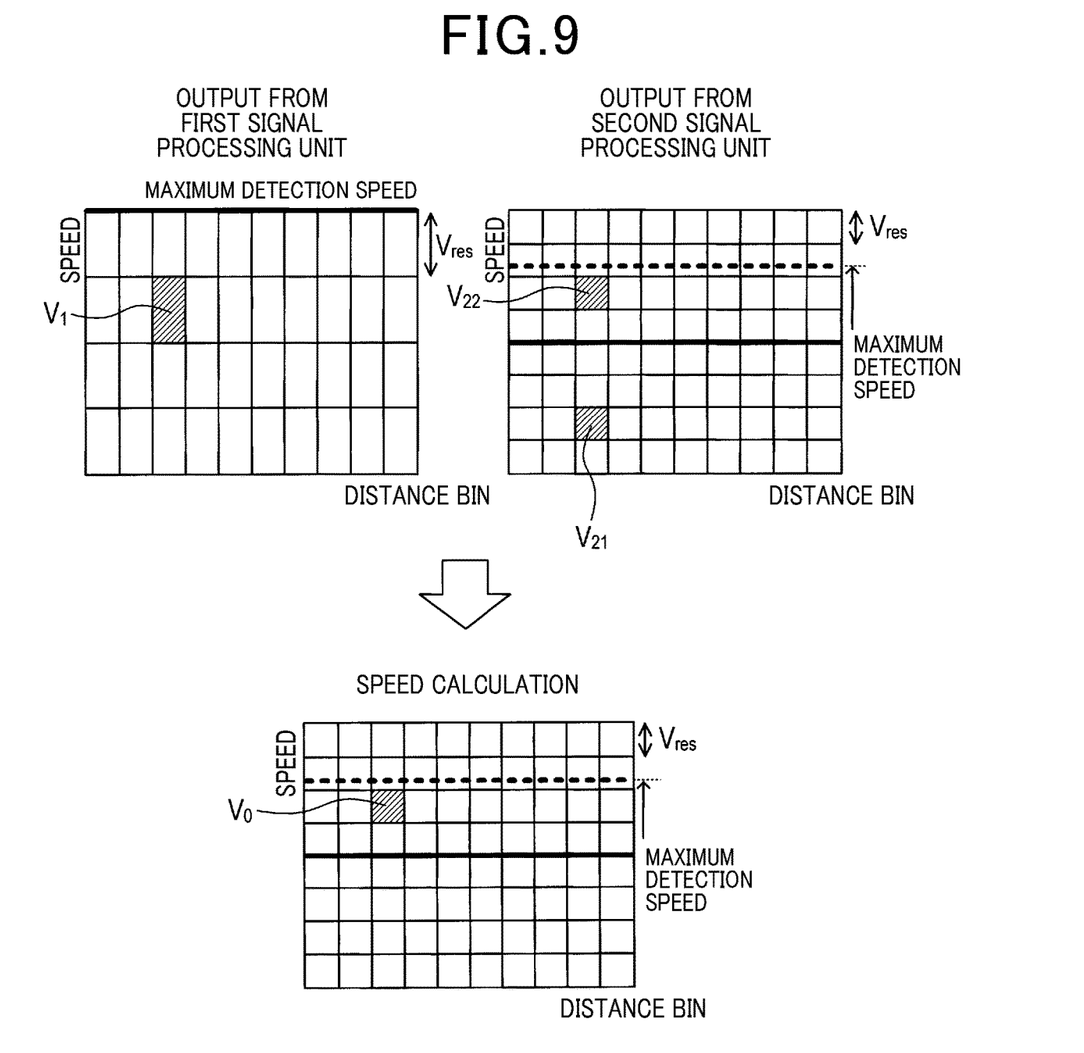
FIG. 9 is a diagram illustrating the method for speed determination according to the first embodiment.
Figure 10:
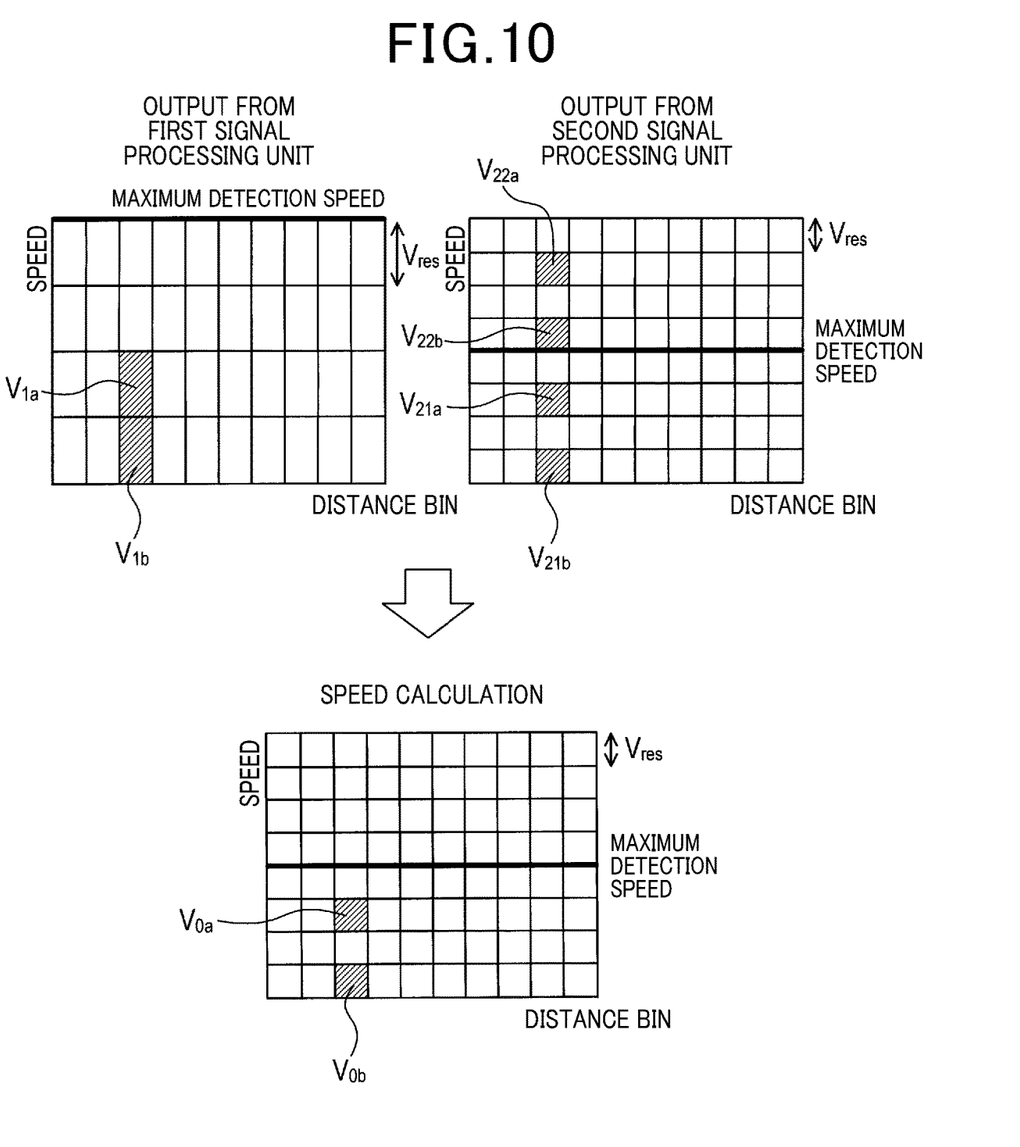
FIG. 10 is a diagram illustrating the method for speed determination according to the first embodiment.

FIGS. 8 to 10 each illustrate an example in which the speed V0 of the object is calculated based on a comparison between output results for the distance and speed from the first signal processing unit 40 and output results for the distance and speed from the second signal processing unit 50. As illustrated in FIGS. 8 to 10, the first signal processing unit 40 and the second signal processing unit 50 use the same distance spectra, and thus the output results from the first signal processing unit 40 are equal in distance resolution to the output results from the second signal processing unit 50.

FIG. 8 and FIG. 9 illustrate an example in which one object is detected, and FIG. 10 illustrates an example in which two objects are detected at the same distance. As illustrated in FIGS. 8 to 10, the first speed V1 is compared with speed candidates V21 and V22 determined from the second speed V2; the first speed V1 and the second speed V2 are calculated at the same distance. One of the speed candidates closer to the first speed V1 is determined to be the speed V0. FIG. 8 illustrates an example in which the speed candidate V21 is determined to be the speed V0 and in which the second speed V2 involves no fold-back. FIG. 9 illustrates an example in which the speed candidate V22 is determined to be the speed V0 and in which the second speed V2 involves fold-back. Additionally, in FIG. 10, first speeds V1a, V1b of two objects are compared with speed candidates V21a, V22a, V21b, and V22b determined from second speeds V2a and V2b of two objects, and the speed candidates V21a and V21b are determined to be speeds V0a and V0b of the two objects FIG. 10 illustrates an example in which the second speeds V2a and V2b involve no fold-back.

1-4. Effects

According to the first embodiment described above, the following effects are produced.

(1) The first speed V1, which has a relatively low speed resolution Vres and allows the speed to be uniquely determined, is compared with a plurality of candidates of the second speed V2, which have relatively high speed resolution Vres and prevent the speed from being uniquely determined, and one of the candidates of the second speed V2 closest to the first speed V1 is determined to be the speed V0. Accordingly, the high-resolution speed V0 can be uniquely determined with an increase in calculation loads on the signal processing unit 20 suppressed.

(2) The second signal processing unit 50 extracts N2 distance spectra from the N1 distance spectra calculated by the first signal processing unit 40. In other words, the second signal processing unit 50 calculates no distance spectra and utilizes the distance spectra calculated by the first signal processing unit 40. Accordingly, compared to a case where the second signal processing unit 50 calculates distance spectra, the present embodiment can suppress an increase in calculation loads on the signal processing unit 20.

(3) The second signal processing unit 50 executes the FFT processing only on the distance BINs included in the extracted distance spectra and representing the distance to the object detected by the first signal processing unit 40, to calculate the second speed spectrum. Accordingly, compared to a case where the FFT processing is executed on all the distances BIN in the extracted distance spectra, the present embodiment can suppress calculation loads on the signal processing unit 20.

(4) The N2 is set to a number at which the adjacent observation points for the beat signals corresponding to the extracted distance spectra are set at regular intervals. This allows the FFT processing to be applied to the extracted distance spectra. Additionally, the N2 is set equal to N1×1/(2n), and thus the speed of the FFT processing can be increased with respect to the extracted distance spectra.

Second Embodiment 2-1. Differences from First Embodiment

A second embodiment has a basic configuration similar to that of the first embodiment. Thus, descriptions of common components are omitted, and the following description focuses on differences between the first and second embodiments. Note that the same reference signs as those in the first embodiment indicate the same components and that for these components, the above description will be referenced.

As illustrated by dashed lines in FIG. 2, the second signal processing unit 50 according to the present embodiment includes the function of a second-number-of-observations calculation unit 53. In the above-described first embodiment, the N2, which is the second number of observations, is preset, and based on the comparison between the first speed V1 and the second V2, the speed V0 of the object is determined. In contrast, in the second embodiment, the second-number-of-observations calculation unit 53 calculates the N2 according to the first speed V1 such that the maximum detectable speed Vmax of the second speed V2 is slightly higher than the first speed V1, as illustrated by the dash lines in FIG. 9. Thus, the second embodiment differs from the first embodiment in that the second speed V2 is calculated that is uniquely determined and that achieves a higher speed resolution Vres than the first speed V1, with the second speed V2 being determined to be the speed V0.

2-1. Speed Detection Processing

Figure 11:
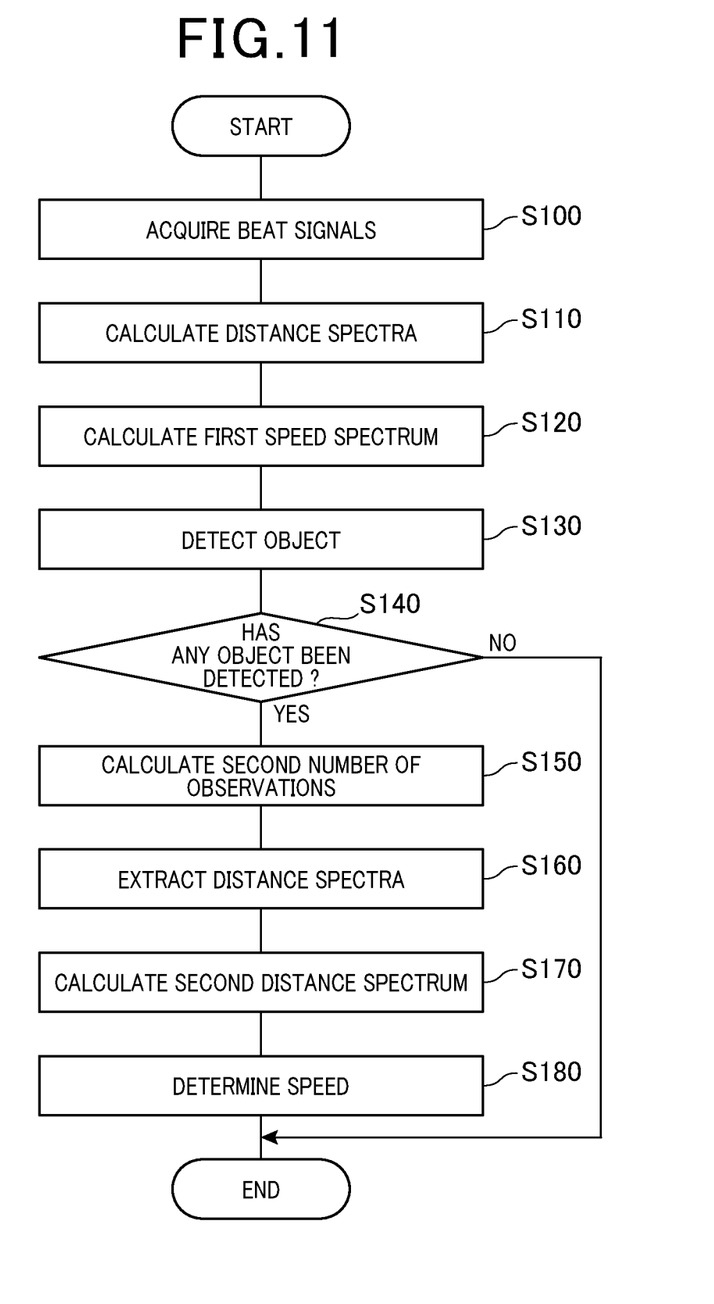
FIG. 11 is a flowchart illustrating a processing procedure for speed detection according to a second embodiment.

Now, a processing procedure for detecting the speed of an object according to the present embodiment will be described with reference to a flowchart in FIG. 11. The processing procedure is executed each time the signal processing unit 20 transmits and receives a predetermined number of chirp waves.

First, in S100 to S140, processing similar to the processing in S10 to S50 is executed.

Subsequently, in S150, the N2, which is the second number of observations, is calculated such that the maximum detectable speed Vmax of the second speed V2 has a larger magnitude than the first speed V1 and that a difference in magnitude between the first speed V1 and the maximum detectable speed Vmax of the second speed V2 is smaller than a difference threshold. The difference threshold may be a preset value or a value set according to the magnitude of the first speed V1, for example, a value that is approximately 10% of the magnitude of the first speed V1. The difference threshold is set to a sufficiently small value to suppress calculation loads. Note that, in a case where a plurality of objects are detected and the first speed V1 of each of the objects is detected, the N2 is calculated such that the difference in magnitude between the largest first speed V1 and the maximum detectable speed Vmax of the second speed V2 is smaller than the difference threshold.

Figure 12:
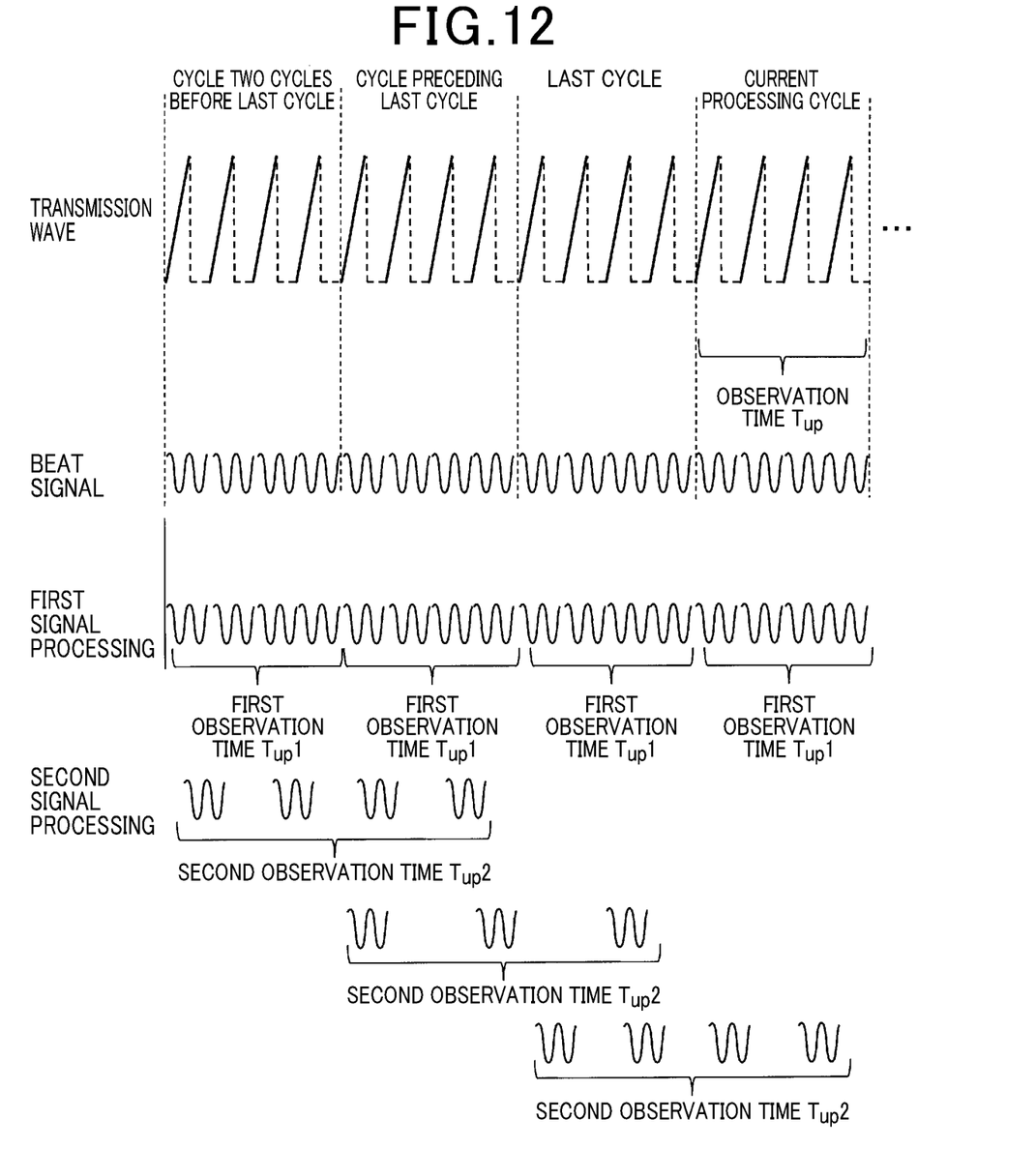
FIG. 12 is a diagram illustrating an example of a first observation time and a first number of observations and a second observation time and a second number of observations according to the second embodiment.

Specifically, the chirp period Tcy2 is calculated based on Expression (1) such that the maximum detectable speed Vmax is equal to a first speed V1+α. Then, the N2 is calculated from the observation time Tup2 and the chirp period Tcy2. Accordingly, as illustrated in FIG. 12, the N2 is a varying value.

Subsequently, in S160, as is the case with S60, the N2 calculated in S150 is used to extract N2 distance spectra from the distance spectra corresponding to the beat signals during the observation time Tup2.

Subsequently, in S170, as is the case with S70, the second speed spectrum is calculated. Then, a peak is extracted from the second speed spectrum, and the second speed V2 is calculated from the speed BIN of the extracted peak. The calculated second speed V2 is uniquely determined and represented as a speed resolution Vres higher than that of the first speed V1.

Subsequently, in S180, the second speed V2 calculated in S170 is determined to be the speed V0, which is the measured speed of the object. Then, the present processing is ended.

2-3. Effects

According to the second embodiment described above, in addition to the effects (1) to (4) of the above-described first embodiment, the following effects are produced.

(5) The N2 is calculated such that the maximum detectable speed Vmax of the second speed V2 is larger in magnitude than the first speed V1 calculated by the first signal processing unit 40 and that a difference in magnitude between the first speed V1 and the maximum detectable speed Vmax of the second speed V2 is smaller than a difference threshold. Thus, for calculation of the uniquely determined second speed V2, the minimum N2 can be calculated. Then, the uniquely determined second speed V2 can be calculated from the calculated N2 beat signals. Accordingly, the high-resolution second speed V2 can be uniquely calculated, with calculation loads on the signal processing unit 20 suppressed.

Other Embodiments

The embodiments of the present disclosure have been described. However, the present disclosure is not limited to the above-described embodiments, and various modifications may be made to the embodiments in implementation.

(a) In the above-described first embodiment, the N2, which is the second number of observations, is preset. However, the present disclosure is not limited to this configuration. Even in the first embodiment, the second signal processing unit 50 may include the function of the second-number-of-observations calculation unit 53 to calculate a variable N2 value, as is the case with the second embodiment. For example, the second-number-of-observations calculation unit 53 may calculate the N2 so as to enable the second speed spectrum to be calculated within a preset calculation time.

In this way, in a case where the signal processing unit 20 is shared with other systems such as a camera device, the N2 corresponding to overall loads on the signal processing unit 20 can be calculated. For example, in a case of an increase in calculation loads imposed on the signal processing unit 20 by other systems, the N2 is reduced to allow the second speed spectrum to be calculated faster. Additionally, in a case of a decrease in calculation loads imposed on the signal processing unit 20 by other systems, the N2 is increased to reduce the chirp period Tcy2, enabling an increase in the maximum detectable speed Vmax of the second speed V2.

(b) In each of the above-described embodiments, an end point of the observation time Tup1 is aligned with an end point of the observation time Tup2. However, the end point of the observation time Tup1 may be misaligned with the end point of the observation time Tup2. For example, the end point of the observation time Tup1 may be misaligned with the end point of the observation time Tup2 by one-third of the processing cycle. However, the misalignment between the end points of the two observation times is equal to or less than half of the processing cycle.

(c) In each of the above-described embodiments, the FFT processing is executed as frequency analysis. However, frequency analysis other than the FFT processing may be executed.

(d) In the above-described embodiments, a plurality of functions of one component may be implemented by a plurality of components, or one function of one component may be implemented by a plurality of components. Additionally, a plurality of functions of a plurality of components may be implemented by one component, or one function implemented by a plurality of components may be implemented by one component. In addition, a part of each of the above-described embodiments may be omitted. Additionally, at least a part of one of the above-described embodiments may be added to or replaced with the configuration of the other of the above-described embodiments. Note that any aspects included in technical concepts identified by only the language recited in claims correspond to embodiments of the present disclosure.

(e) The present disclosure can be implemented in various forms other than the above-described radar device, for example, in form of a system including the radar device as a component, a speed detection device, a program for causing a computer to function as the speed detection device, a non-transitory tangible recording medium such as a semiconductor memory in which the program is recorded, or a speed detection method.

What is claimed is:

1. A radar device comprising:
   a beat signal generation unit configured to transmit and receive a chirp wave having at least a continuously increasing or decreasing frequency, to repeat generation of beat signals;

a first signal processing unit configured to observe the beat signals generated by the beat signal generation unit by performing a set first number of observations during a set first observation time and to calculate a first speed from phase rotation of a frequency component detected in a time series of the beat signals of which number is equal to the first number of observations;

a second signal processing unit configured to observe the beat signals generated by the beat signal generation unit by performing a second number of observations during a second observation time and to calculate a second speed from phase rotation of a frequency component detected in a time series of the beat signals of which number is equal to the second number of observations, the second observation time being an observation time set longer than the first observation time, a time ratio being a ratio of the second observation time to the first observation time, and the second number of observations being smaller than the first number of observations multiplied by the time ratio; and a speed determination unit configured to uniquely determine a result of measurement of speed represented by a resolution realized by the second signal processing unit, using the first speed calculated by the first signal processing unit.

2. The radar device according to claim 1, wherein
the speed determination unit is configured to determine the result of measurement to be the speed closest to the first speed calculated by the first signal processing unit among a plurality of speeds being determined in consideration of fold-back of the second speed calculated by the second signal processing unit.

3. The radar device according to claim 1, wherein
the second signal processing unit comprising:
a second-number-of-observations calculation unit configured to calculate the second number of observations such that a maximum detectable speed of the second speed is larger in magnitude than the first speed detected by the first signal processing unit and that a difference in magnitude between the first speed and the maximum detectable speed of the second speed is smaller than a difference threshold, and
the speed determination unit is configured to determine the second speed calculated by the second signal processing unit to be the result of measurement.

4. The radar device according to claim 1, wherein
the first signal processing unit comprising:
a distance spectrum calculation unit configured to perform frequency analysis on each of the beat signals of which number is equal to the first number of observations to calculate distance spectra that represent distance information and of which number is equal to the first number of observations; and a first speed spectrum calculation unit configured to perform frequency analysis, for each of distance components, on the distance spectra calculated by the distance spectrum calculation unit to calculate a first speed spectrum representing speed information, and
the second signal processing unit comprising:
a distance spectrum extraction unit configured to extract the distance spectra of which number is equal to the second number of observations, from the distance spectra calculated by the distance spectrum calculation unit during a current processing cycle and the distance spectra calculated by the distance spectrum calculation unit during at least one latest, past processing cycle; and
a second speed spectrum calculation unit configured to perform frequency analysis, for each of distance components, on the distance spectra of which number is equal to the second number of observations and which are extracted by the distance spectrum extraction unit to calculate a second speed spectrum representing speed information.

5. The radar device according to claim 4, wherein
the first signal processing unit comprising:
an object detection unit configured to detect an object from the distance spectra of which number is equal to the first number of observations and which are calculated by the distance spectrum calculation unit and the first speed spectrum for each of the distance components calculated by the first speed spectrum calculation unit, and
the second speed spectrum calculation unit is configured to calculate the second speed spectrum by performing frequency analysis only on the distance components representing a distance to an object detected by the object detection unit, the distance components being included in the distance spectra of which number is equal to the second number of observations and which are extracted by the distance spectrum extraction unit.

6. The radar device according to claim 4, wherein
the second signal processing unit comprises a second-number-of-observations calculation unit calculating the second number of observations, and
the second-number-of-observations calculation unit is configured to calculate, within a set calculation time, the second number of observations at which the second speed spectrum is calculatable.

7. The radar device according to claim 1, wherein
the second number of observations is a number at which observation points for the beat signals are set at regular intervals and which is equal to the first number of observations multiplied by $1/(2n)$ (n is a positive integer).

* * * * *